(12) United States Patent
Nishikawa et al.

(10) Patent No.: US 7,129,933 B1
(45) Date of Patent: Oct. 31, 2006

(54) TOUCH-OPERATING INPUT DEVICE, DISPLAY SYSTEM, AND TOUCH-OPERATION ASSISTING METHOD FOR TOUCH-OPERATING INPUT DEVICE

(75) Inventors: Masato Nishikawa, Aichi-ken (JP); Chikao Nagasaka, Aichi-ken (JP); Yoshimasa Kunimatsu, Aichi-ken (JP)

(73) Assignee: Kabushiki Kaisha Tokai-Rika-Denki Seisakusho, Aichi-Ken (JP)

( * ) Notice: Subject to any disclaimer, the term of this patent is extended or adjusted under 35 U.S.C. 154(b) by 0 days.

(21) Appl. No.: 09/470,377

(22) Filed: Dec. 22, 1999

Related U.S. Application Data

(63) Continuation-in-part of application No. 09/102,904, filed on Jun. 23, 1998, now Pat. No. 6,198,475.

(30) Foreign Application Priority Data

Dec. 25, 1998 (JP) .................................. 10-369998
Dec. 25, 1998 (JP) .................................. 10-369999

(51) Int. Cl.
*G09G 5/00* (2006.01)
(52) U.S. Cl. .................................... 345/173; 178/18.01
(58) Field of Classification Search ................ 345/173, 345/174, 178, 175, 177, 179; 178/18.01, 178/18.03, 18.09; 340/990, 995
See application file for complete search history.

(56) References Cited

U.S. PATENT DOCUMENTS 4,565,460 A * 1/1986 Kline .......................... 400/490
6,191,777 B1 * 2/2001 Yasuhara et al. ............ 345/173
6,198,475 B1 * 3/2001 Kunimatsu et al. ......... 345/173
6,232,961 B1 * 5/2001 Kunimatsu et al. ......... 345/173
6,369,803 B1 * 4/2002 Brisebois et al. ............ 345/173
6,507,338 B1 * 1/2003 Liao et al. ................... 345/173

FOREIGN PATENT DOCUMENTS

| EP | 0 884 691 A2 | | 12/1998 |
|---|---|---|---|
| JP | 02240715 | | 9/1990 |
| JP | 5046313 | | 2/1993 |
| JP | 9-109802 | | 4/1997 |
| JP | 10-31547 | | 2/1998 |
| JP | 411232026 | * | 8/1999 |
| JP | 2000-181629 | | 6/2000 |
| WO | WO 97/18546 | | 5/1997 |
| WO | WO 98/08241 | | 2/1998 |
| WO | WO 98/09446 | | 3/1998 |

* cited by examiner

*Primary Examiner*—Richard Hjerpe
*Assistant Examiner*—Jean Lesperance
(74) *Attorney, Agent, or Firm*—Knobbe Martens Olson & Bear LLP

(57) ABSTRACT

A touch-operation guide shape is formed on an input pad for inputting a touch operation by variably deforming the surface of the input pad, forming grooves or the like to enable a user to recognize the operation position on the input pad through finger touch. In addition, an image representing the touch-operation guide shape is displayed on a menu frame of a display together with selection items, whereby the corresponding position on the input pad can be recognized on the screen of the display.

11 Claims, 15 Drawing Sheets

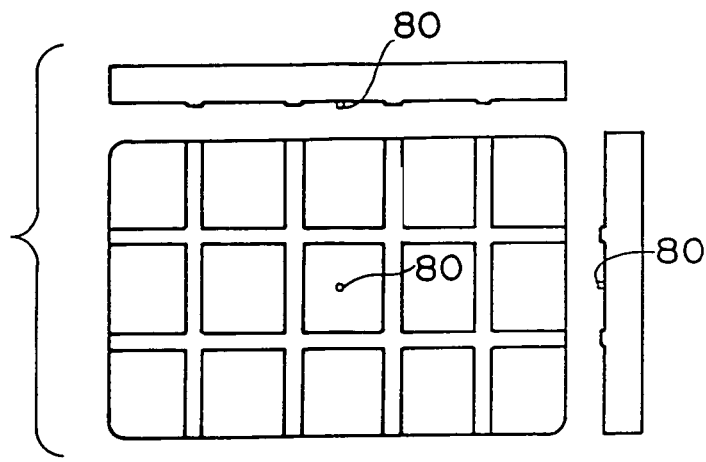
F I G. 1 5
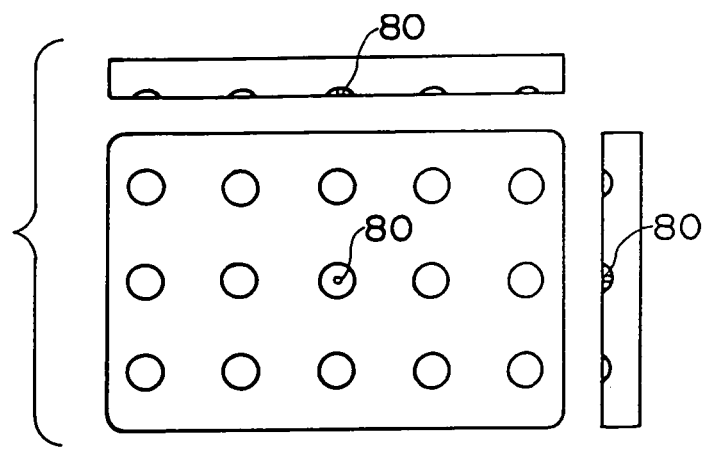
F I G. 1 6
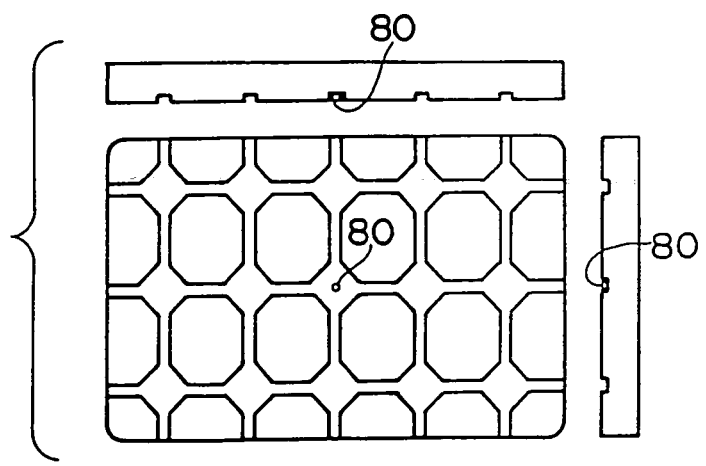
F I G. 1 7

TOUCH-OPERATING INPUT DEVICE, DISPLAY SYSTEM, AND TOUCH-OPERATION ASSISTING METHOD FOR TOUCH-OPERATING INPUT DEVICE

RELATED APPLICATIONS

This application is a continuation-in part application which claims priority under 35 U.S.C. § 120 from U.S. patent application Ser. No. 09/102,904, filed Jun. 23, 1998, now U.S. Pat. No. 6,198,475, issued Mar. 6, 2001.

BACKGROUND OF THE INVENTION

1. Field of the Invention

The present invention relates to a touch-operating input device for inputting touch-operation information by touching an operation panel (touch panel), a display system and a touch-operation assisting method for the touch-operating input device.

2. Description of the Related Art

Recently, there have more and more frequently appeared cars each of which is provided with a display device having a touch-operation function. One type of such a display device is designed so that the touch position on a display screen is detected by a photosensor.

More specifically, light emitting elements and photodetecting elements are disposed so that plural optical axes thereof are arranged in parallel in each of the longitudinal and lateral directions of the display screen. According to this type display device, the optical axes extending from some light emitting elements to the corresponding photodetecting elements are intercepted by touching the display screen with a finger to detect the center position of the touch area, and the coordinate data of the center position on the display screen is outputted.

Besides, there has been known a display device in which a display unit and a touch-operating input device are separately provided and the touch-operating input device is independently disposed at such a suitable position as to be easily operated. A touch position detecting method of the touch-operation input device of the display device is the same as the display/inputting device integral type display device described above. Such a touch-operating input device can bring cars with convenient operation performance.

However, with the conventional touch-operating input device as described above, when a user inputs an item displayed on a display screen by touching the touch-operation panel while looking at the display screen, it is difficult for the user to identify the positional relationship between the item displayed on the display screen and the corresponding item on the touch-operation panel.

SUMMARY OF THE INVENTION

The present invention is aimed to provide a touch-operating input device, a display system and a touch-operation assisting method for a touch-operating input device, which enable a user to easily identify the positional relationship between an item displayed on the screen of a display unit and the corresponding item on the touch-operation panel, and to enhance the blind operability of the touch-operating input device.

In order to attain this, according to a first aspect of the present invention, a touch-operating input device having a display device for displaying operation function items and a touch panel which is provided separately from the display device and serves to select the function items by performing a touch operation, is characterized in that a touch-operation guide shape is formed on the touch-operation face of the touch panel. That is, according to the present invention, since the touch-operation guide shape is formed on the touch-operation face of the touch panel, the touch operation is assisted by the touch-operation guide shape, and a user can more easily identify the positional relationship between the position of any operation function item displayed on the display device and the corresponding position on the touch-operation face of the touch panel, thereby enhancing the blind operability.

According to a second aspect of the present invention, in the touch-operating input device of the first aspect, at least one of a projecting portion and a recessed portion is formed at the center portion of the touch panel. By providing the projecting portion or the recessed portion at the center portion of the touch panel of the touch-operation input device, the center of the touch panel can be easily recognized. That is, the user can easily operate any desired operational position on the touch panel on the basis of the projecting or recessed portion at the center of the touch panel which serves as a home position of the touch panel, so that the blind operability of the touch operation can be enhanced.

According to a third aspect of the present invention, in the touch-operating input device of the second aspect, at least one of the projecting shape and the recessed shape is designed so as to guide the touch operation in the lateral direction of the touch panel. By providing the projecting portion or recessed portion for guiding the touch operation along the lateral direction of the touch panel of the touch-operating input device, the displacement of the operation position in the finger touch operation in the longitudinal direction can be prevented by touching along the projecting or recess portion when the touch-operation face of the touch panel is touched along the lateral direction, thereby enhancing the blind operability.

According to a fourth aspect of the present invention, in the touch-operating input device of the second aspect, at least one of the projecting shape and the recessed shape is designed so as to guide the touch operation in the longitudinal direction of the touch panel. By providing the projecting portion or recessed portion for guiding the touch operation along the longitudinal direction of the touch panel of the touch-operating input device, the displacement of the operation position in the finger touch operation in the lateral direction can be prevented by touching along the projecting or recessed portion when the touch-operation face of the touch panel is touched along the longitudinal direction, thereby enhancing the blind operability.

According to a fifth aspect of the present invention, the touch-operating input device of the first aspect is further provided with control means for controlling the display device to display an image representing the touch-operation guide shape and the operation function items in superposition with each other.

According to a sixth aspect of the present invention, there is provided a display system having a display device for displaying the operation function items, and the touch-operating input device of any one of the first to fifth aspect of the present invention.

According to a seventh aspect of the present invention, in the display system of the sixth aspect, the display device displays an image representing the touch-operation face and the operation function items in superposition with each other.

As described in the fifth and seventh aspects of the present invention, the image representing the touch-operation face and the operation function items are displayed while being superposed on each other, so that the touch operation can be assisted and the positional relationship between the position of the operation function item displayed on the display device and the corresponding position on the touch-operation face can be easily identified, thereby enhancing the blind operability.

BRIEF DESCRIPTION OF THE DRAWINGS

FIG. 15 is a front view showing a fifth embodiment of the input pad, which contains sectional view showing two faces perpendicular to each other;

FIG. 16 is a front view showing a sixth embodiment of the input pad, which contains sectional view showing two faces perpendicular to each other;

FIG. 17 is a front view showing a seventh embodiment of the input pad, which contains sectional view showing two faces perpendicular to each other;

DESCRIPTION OF THE PREFERRED EMBODIMENTS

Preferred embodiments according to the present invention are described with reference to the accompanying drawings. In the following embodiments, the present invention is applied to a display system which is used while being installed in a car (hereinafter merely referred to as "display system").

Figure 1:
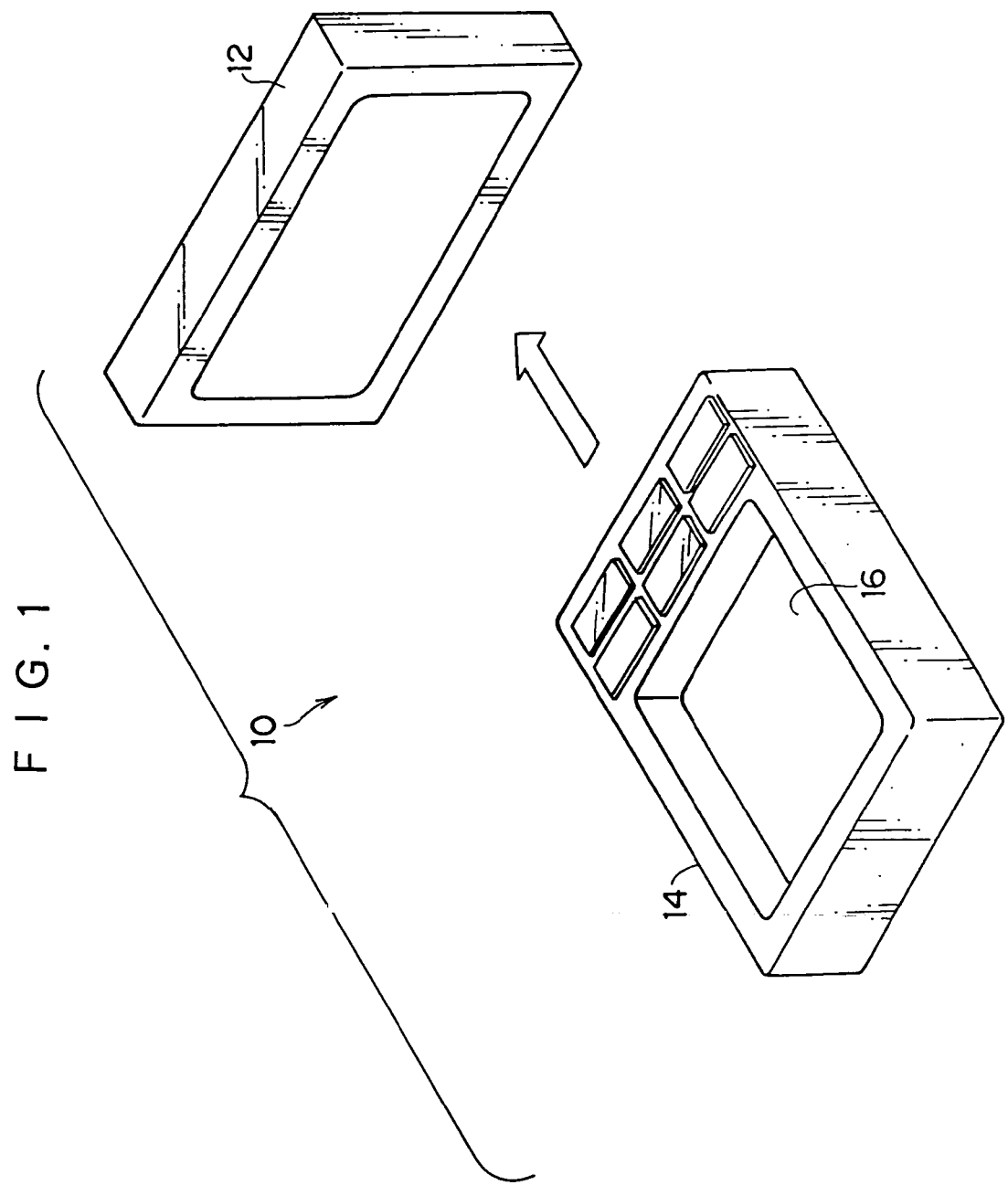
FIG. 1 is a perspective view showing the construction of a display system according to a preferred mode of the present invention.

FIG. 1 shows the whole construction of a display system 10. The display system 10 is used to operate accessories installed in a car such as an air conditioner, an audio instrument, a navigation system, etc., and mainly comprises a display 12 and a touch-operating input device 14 (hereinafter referred to as "touch tracer").

The display 12 is disposed at the center portion of an instrument panel so that a driver and a fellow passenger can easily view the display 12, and the operational status of the air conditioner or the audio instrument, the guide map frame of the navigation system or the like is displayed on the display 12. That is, a desired display frame is displayed on the display 12 in accordance with operation input information from the touch tracer 14.

The touch tracer 14 is disposed at such a suitable position that the driver can easily operate it, for example, it is provided to an armrest at the driver's seat door side, a center console or the like, and the accessories such as the air conditioner, the audio instrument, the navigation system, etc. are operated by touching the touch tracer 14 with a finger (i.e., by performing a touch operation on the touch tracer 14).

Figure 2:
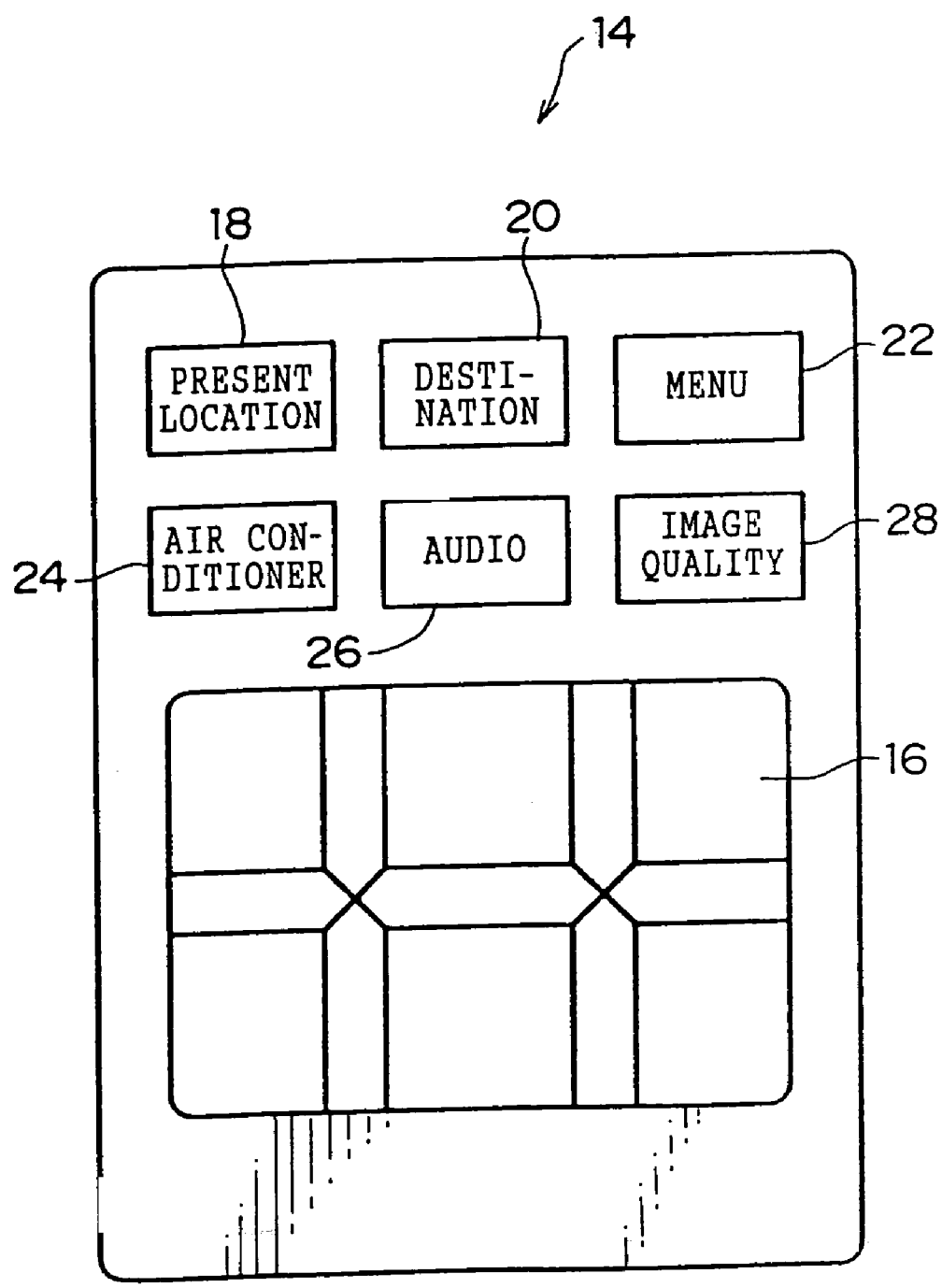
FIG. 2 is a front view showing a touch tracer.

FIG. 2 is a front view showing the touch tracer. As shown in FIG. 2, an input pad 16 is disposed at the center portion of the touch tracer 14, and selection buttons for selecting various modes are disposed around the input pad 16. As these selection buttons are provided a present location button 18, a destination button 20, a menu button 22, an air conditioner button 24, an audio button 26, and an image quality button 28. By pushing any one of the mode selection buttons, the display frame corresponding to the mode selection button pushed is displayed on the display 12.

Figure 3:
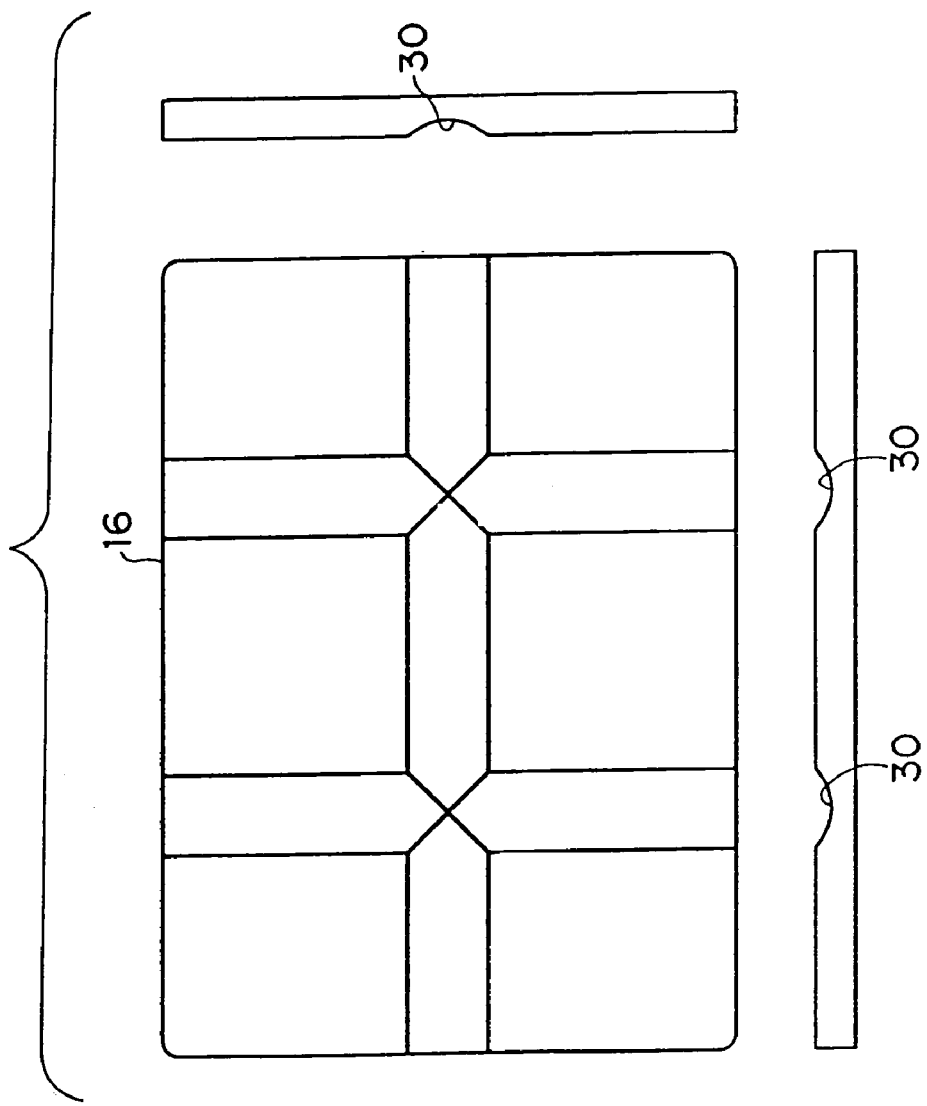
FIG. 3 is a front view showing an embodiment of an input pad, which contains sectional views showing two faces perpendicular to each other.

A touch-operation guide shape is provided on the input pad 16 for inputting the touch operation. That is, as shown in FIG. 3, two finger guide grooves 30 extending in the longitudinal direction and one finger guide groove 30 extending in the lateral direction are formed on the input pad 16 so as to cross each other, and each of these finger guide grooves 30 is designed to have an arcuate section. With the groove structure on the input pad 16, the driver can recognize the operation position of the input pad with the sense of touch. Further, since the finger guide grooves 30 are designed to be arcuate in section, the driver or the fellow passenger can easily guide his/her finger along the grooves when sliding the finger in the longitudinal and lateral directions, and thus the displacement of the operation position in the finger touch operation can be prevented. The locations of the finger guide grooves 30 are determined in connection with the position of the button display portion displayed on the display 12, and the driver or the fellow passenger can select any button through blind operation.

Figure 4:
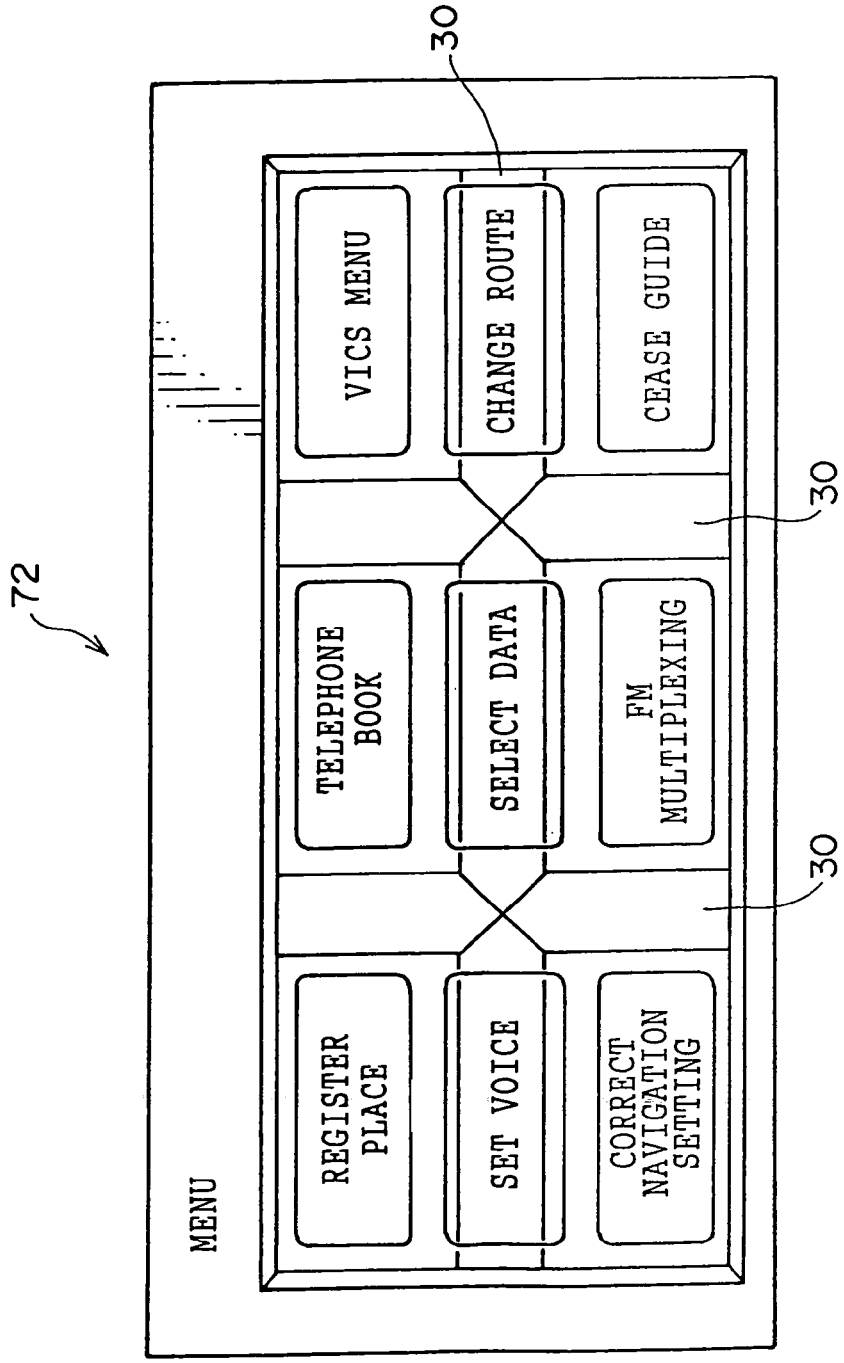
FIG. 4 is a diagram showing a menu frame represented on a display.

Further, as shown in FIG. 4, an image representing the finger guide grooves 30 formed on the input pad 16 is displayed on a display frame (FIG. 4 shows a menu frame 72) displayed on the display 12, and thus the positional relationship between the input pad 16 and the display frame of the display 12 can be easily recognized, thereby assisting the operation of the input pad 16. The touch tracer is designed so that when the driver or the fellow passenger touches the input pad 16 having the finger guide grooves 30 with his/her finger while viewing the display 12, the indicated item on the display frame of the display 12 is inverted in color. That is, the blind operation can be carried out without confirming the operation position of the input pad 16, and the operation can be easily performed by viewing only the display frame of the display 12.

Figure 5:
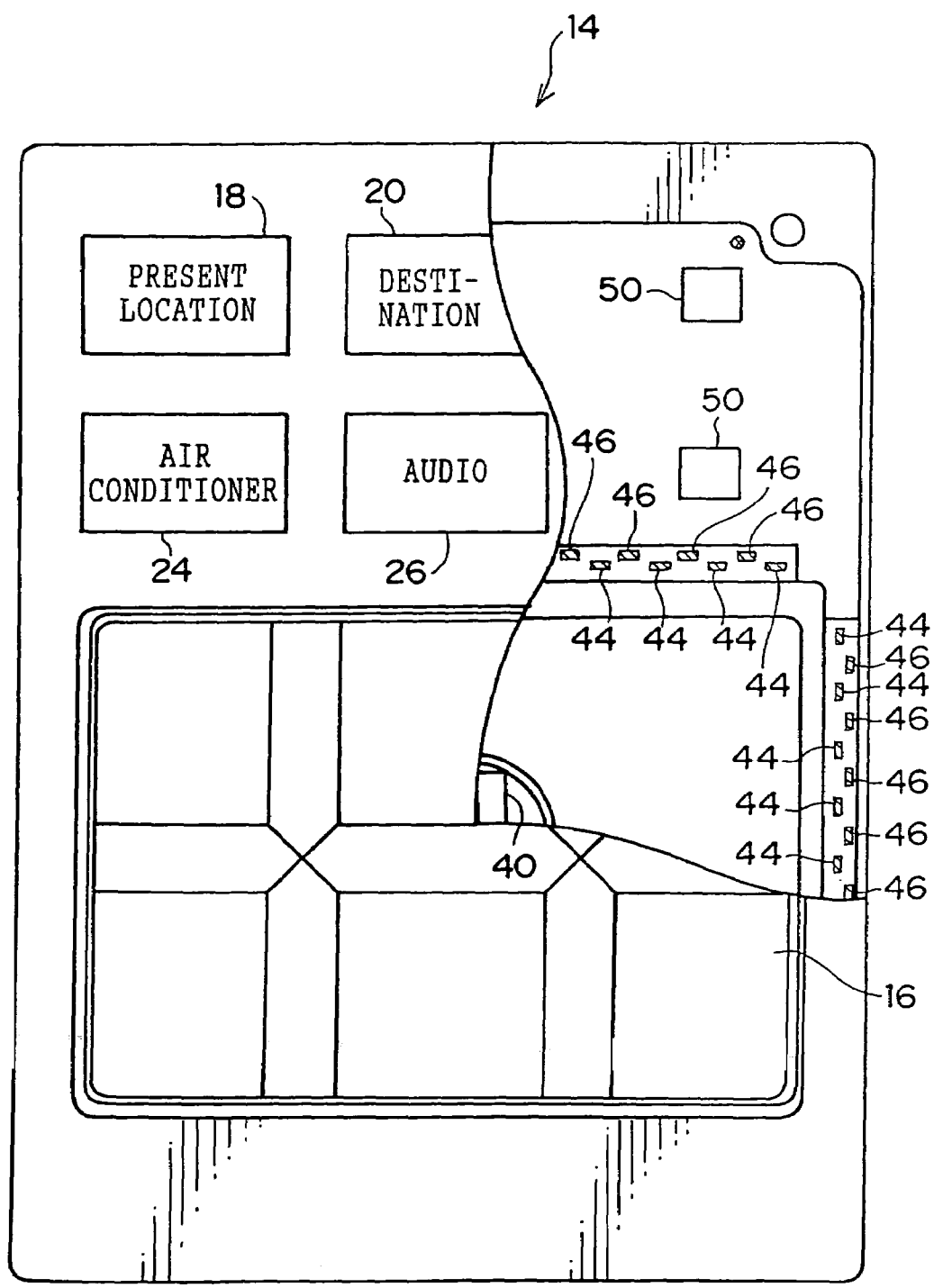
FIG. 5 is a front view showing the touch tracer, which partially contains a cutaway view.
Figure 6:
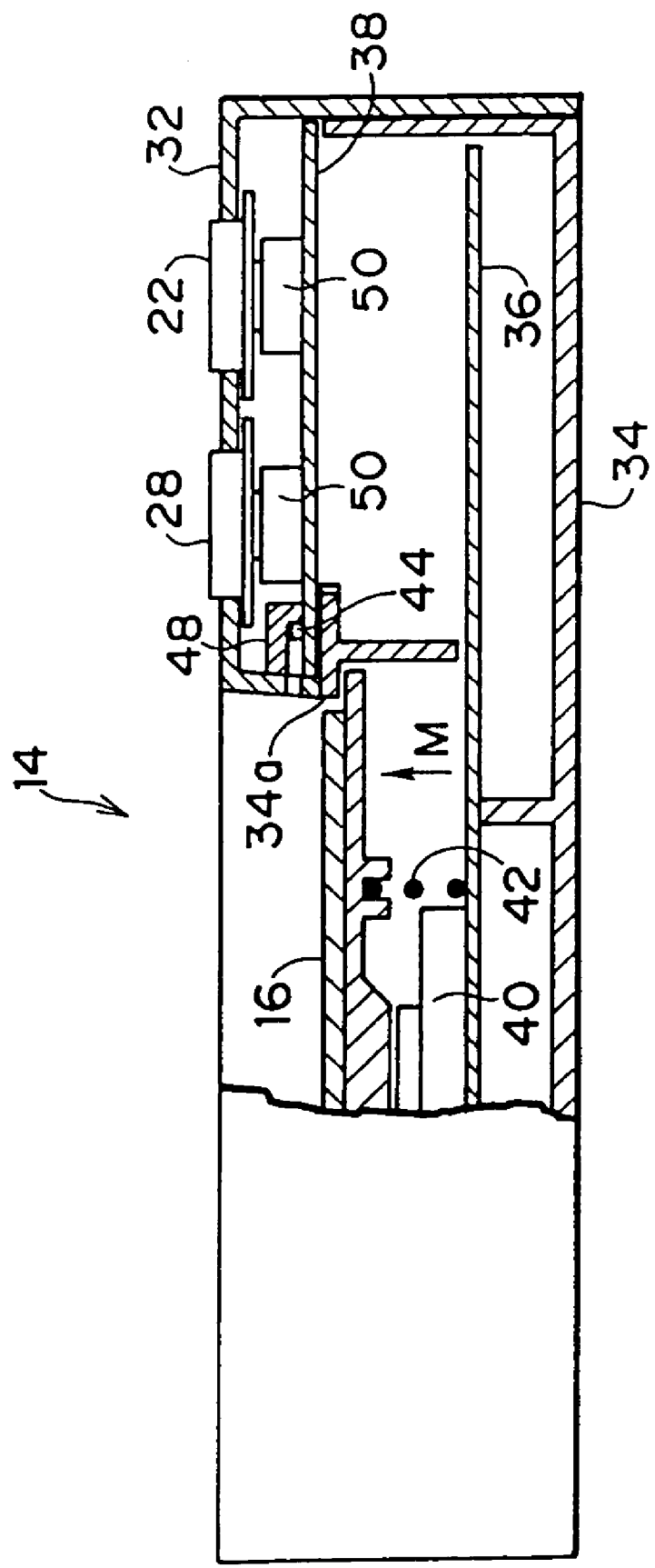
FIG. 6 is a cross-sectional view showing the touch tracer.

Next, the internal construction of the touch tracer 14 is described with reference to FIGS. 5 and 6. FIG. 5 is a front view showing the touch tracer 14, which partially contains a cutaway view. FIG. 6 is a cross-sectional view showing the touch tracer 14 which is partially cut away.

The touch tracer 14 has an outer frame comprising an outer casing A32 and an outer casing B34. A printed wiring board 36 is disposed on the outer casing B34 serving as the bottom surface of the touch tracer 14, and a printed wiring board 38 is disposed above the printed wiring board 36. A switch 40 for touch is mounted at the center portion of the printed wiring board 36, and a compression coil spring 42 is also provided at the center portion of the printed wiring board 36 so that the touch switch 40 is inserted at the center of the compression coil spring 42. The input pad 16 is urged in the direction of an arrow M by the compression coil spring 42. The touch switch 40 serves to determine the position of the touch operation on the input pad 16, and it is switched on by touching a finger to a desired position on the input pad 16 and pushing the finger against the input pad 16.

A substantially T-shaped member 34a is provided to the outer casing B34 to suppress the outer periphery of the input pad 16 against the urging force of the compression coil spring 42, and it acts as a supporting point for the input pad 16 when any position of the input pad 16 is pushed to switch on the touch switch 40.

Further, an optical sensor unit is mounted on the print wiring board 38. The optical sensor unit includes plural LEDs 44 and plural phototransistors 46 so as to be paired in one-to-one correspondence. Each of the LEDs 44 and each of the phototransistors 46 are arranged so as to confront each other and so that the respective optical axes each extending from each LED 44 to the corresponding phototransistor 46 are arranged in parallel. Further, the LEDs 44 and the phototransistors 46 are connected to an electrical circuit of the printed wiring board 38, and covered by a light shielding member 48 so as to intercept light from/to the neighboring LEDs 44 or phototransistors 46. Accordingly, the light shielding member 48 intercepts all light other than the light required for the LEDs 44 and the phototransistors 46 arranged so as to confront each other.

Besides, plural switches 50 for operation are mounted on the printed wiring board 38, and a corresponding operation switch 50 is turned on in accordance with the operation of any one of the selection buttons 18 through 28 for selecting various modes.

Figure 7:
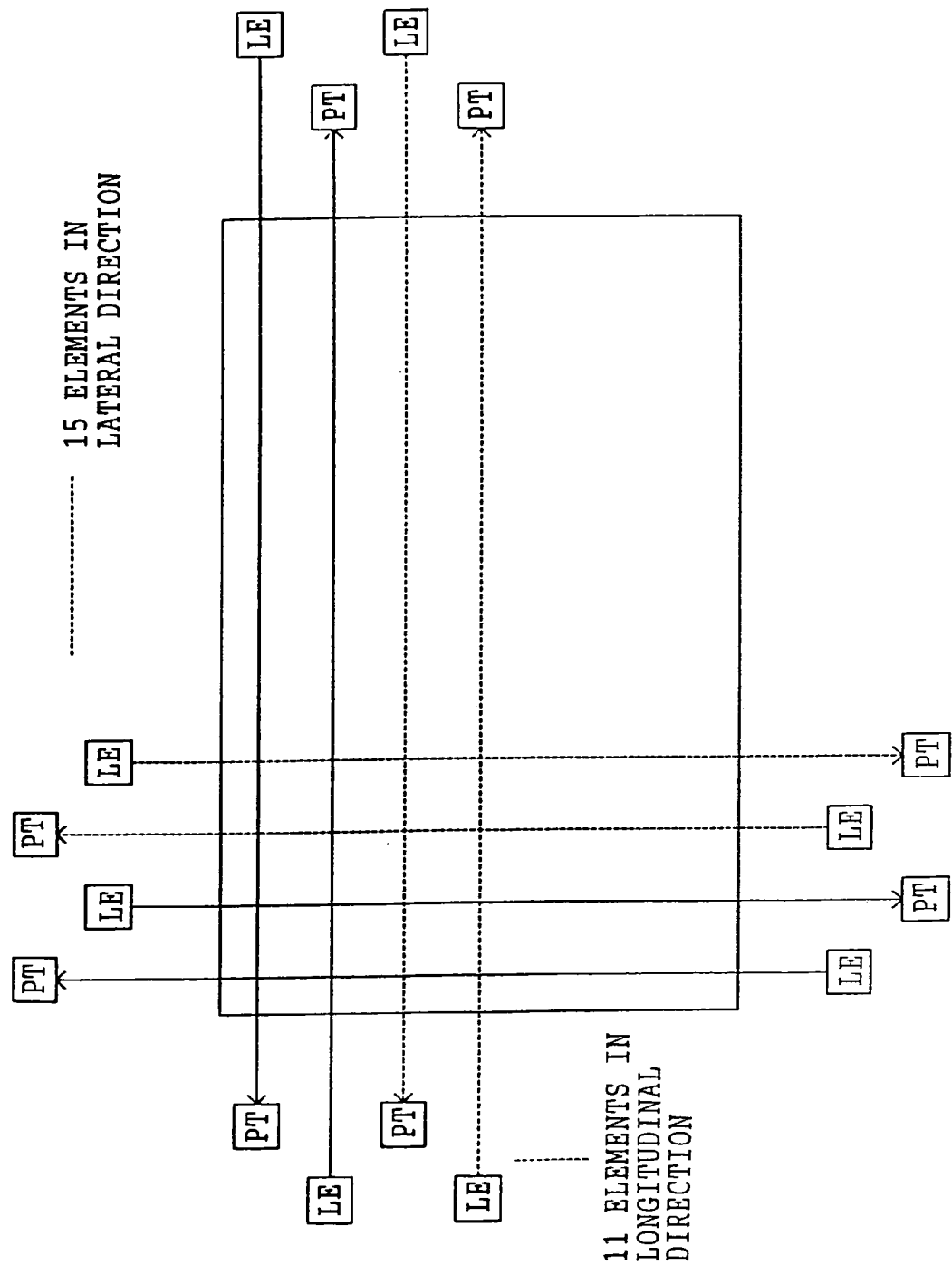
FIG. 7 is a diagram showing the arrangement relationship between LEDs serving as light emitting elements and phototransistors serving as photodetecting elements.

FIG. 7 shows the arrangement of the LEDs (LE) 44 and the phototransistors (PT) 46. In FIG. 7, 15 optical axes (hereinafter referred to as "X lines") are set in the longitudinal direction and 11 optical axes (hereinafter referred to as "Y lines") are set in the lateral direction. In this case, the LEDs 44 and the phototransistors 46 are alternately arranged in parallel in each of the X and Y lines so that each phototransistor 46 is located at the back side of the neighboring LEDs 44, whereby the optical axis pitch of the X line and the Y line can be reduced.

Figure 8:
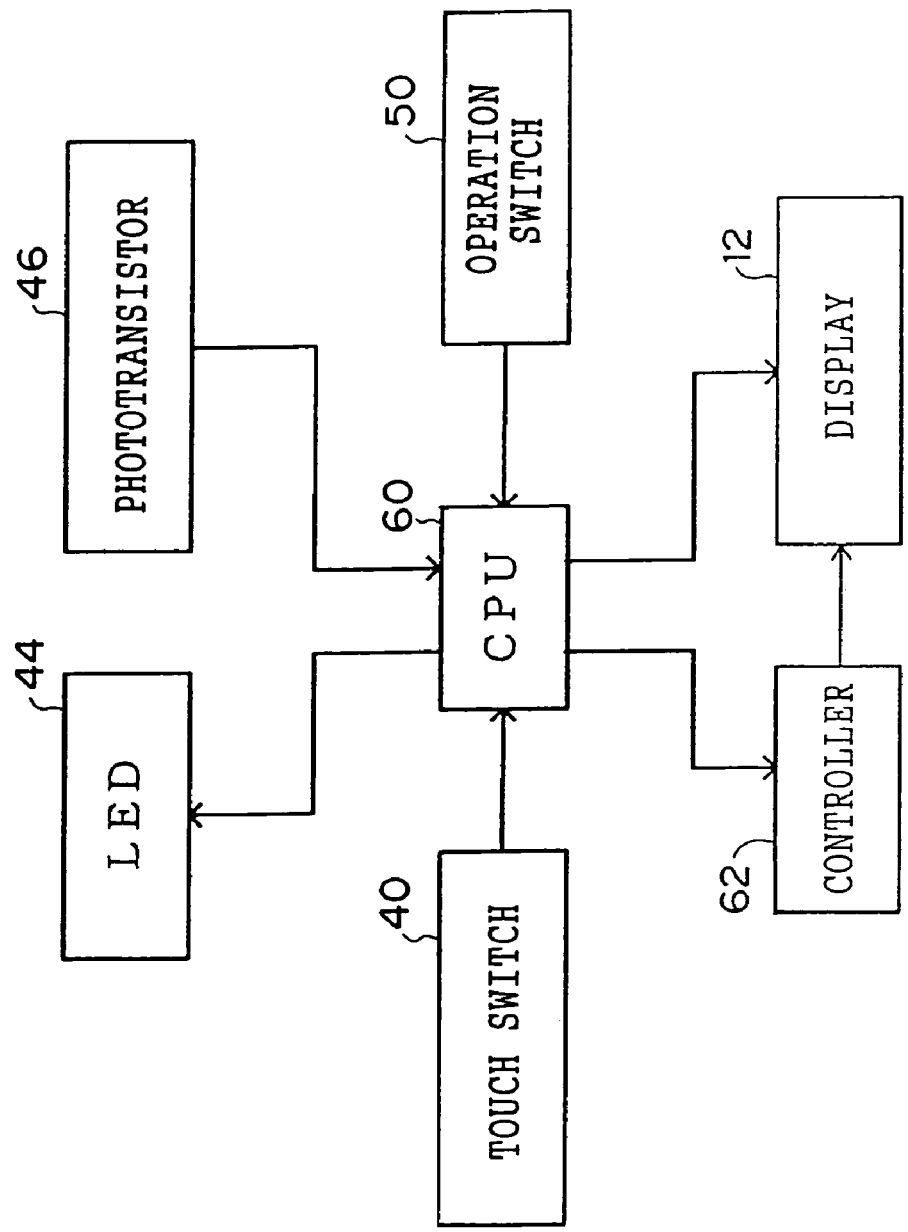
FIG. 8 is a block diagram showing the electrical construction according to an embodiment of the present invention.

FIG. 8 is a block diagram showing the electrical construction of the display system 10. In the display system 10, the LEDs 44, the phototransistors 46, the touch switch 40 and the operation switches 50 arranged in the touch tracer 14 are connected to a CPU 60, and the CPU 60 is connected to a controller 62 for controlling the accessories such as the air conditioner, the audio instrument, the navigation system, etc., and the display 12.

The CPU 60 turns on the LEDs 44 arranged in the X line and the Y line, detects the signals of the phototransistors 46 for photodetecting light emitted from the LEDs 44 and then calculates on the basis of the signals outputted from the phototransistors 46 the position coordinate of the position on the input pad 16 which is touched by the finger. The finger-touched position coordinate is determined by calculating the center position coordinate of each of some X and Y lines on which light is intercepted by the finger and then setting the center position coordinates thus calculated as the touch position on the input pad 16.

Further, the CPU 60 converts the finger-touched position coordinate thus calculated to the position coordinate corresponding to the display position on the display 12 and outputs the conversion result to the display 12. On the basis of the position coordinate information outputted from the CPU 60, the finger-touched position on the input pad 16 is displayed on the screen of the display 12. The position display on the screen is carried out by inverting the color of the selected item. The position display may be carried out by using an arrow or the like.

When the touch switch 40 is pushed in such a state that a selection item is determined on the input pad, a signal is outputted from the touch switch 40 to the CPU 60, and the CPU 60 outputs to the controller 62 a signal for displaying the selected item on the display 12. The controller 62 outputs to the display 12 information for switching the current display frame to a display frame for the selected item, whereby the display frame being displayed on the display 12 is switched to the display frame for the selected item. When the operation switch 50 of the touch tracer 14 is pushed, the controller 62 controls the display 12 to display the display frame corresponding to each of the selection buttons 18 through 28 which are used to select a desired (pushed) mode.

Next, the operation of the touch tracer 14 when the touch operation is carried out is described.

Figure 9:
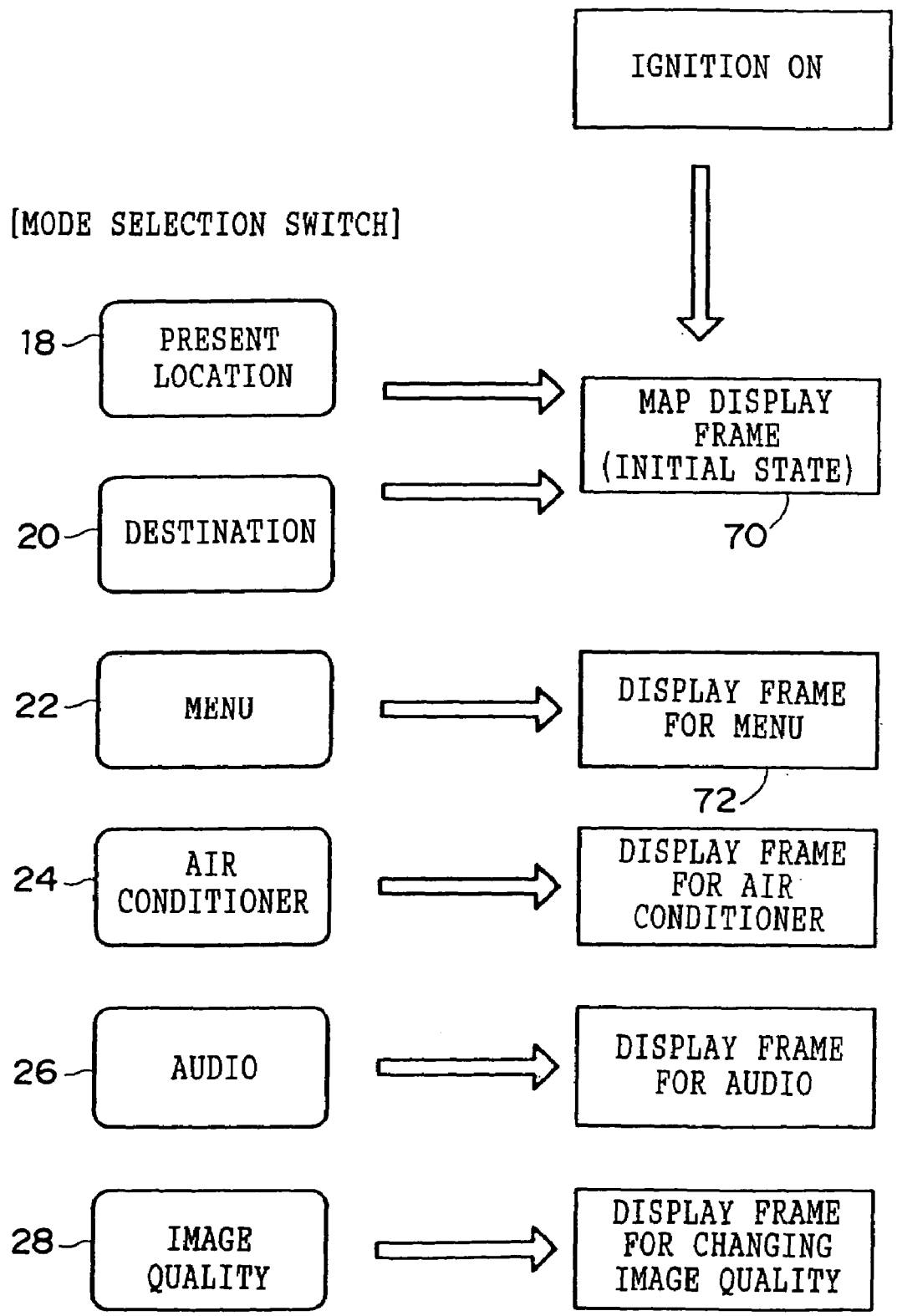
FIG. 9 is a diagram showing a display frame which is conformed with an operation carried on the touch tracer.

As shown in FIG. 9, the navigation function is set to operate as an initial function in a state that an ignition switch is turned on to turn the power on and the optical sensor unit disposed in the touch tracer 14 is also turned on, so that the device is kept under a detection standby state.

Figure 10:
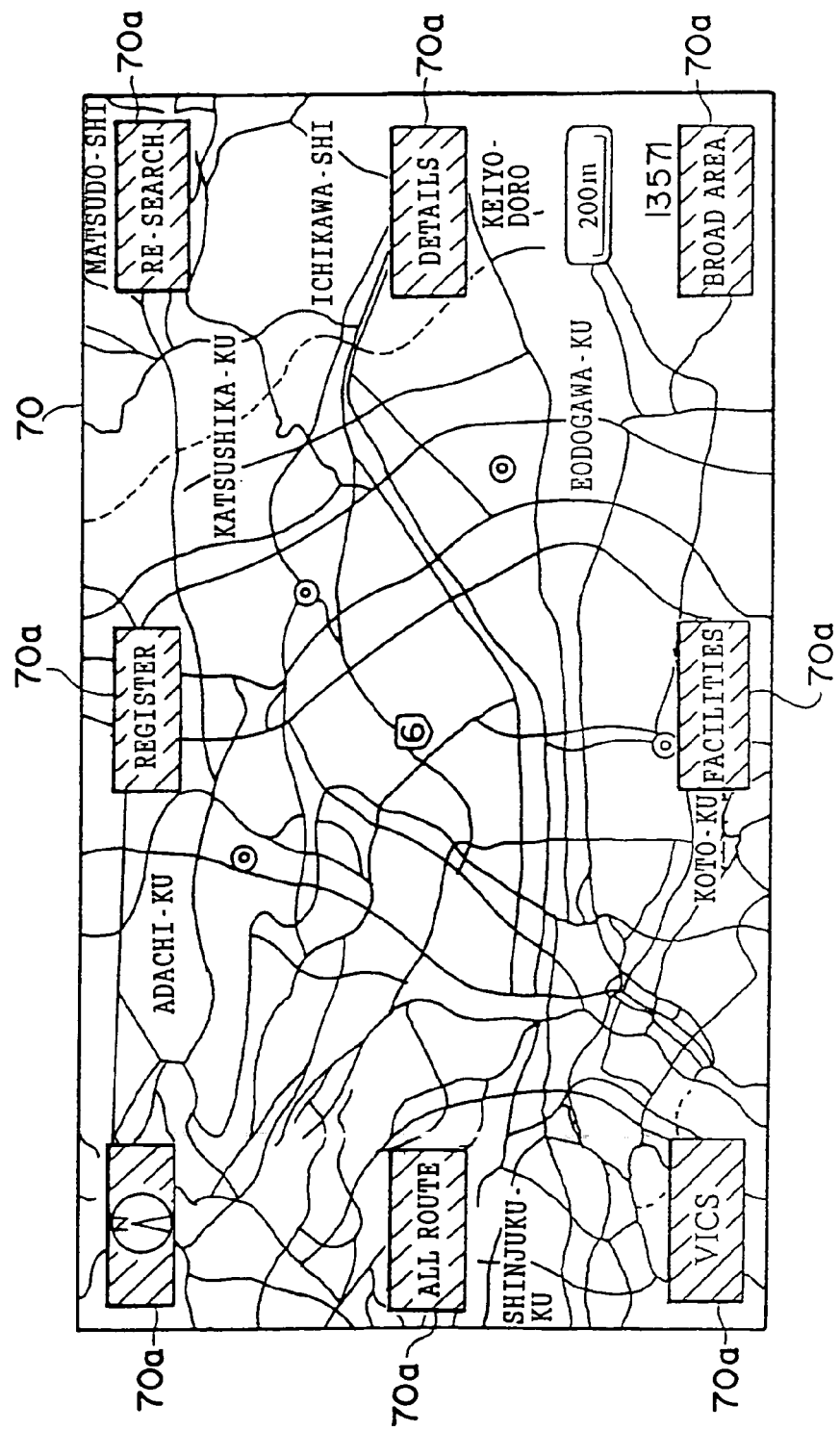
FIG. 10 is a diagram showing a map display frame displayed on the display.

For example, a map display frame 70 indicating the present location as shown in FIG. 10 is displayed as an initial display frame on the screen of the display 12. At this time, navigation function selecting button display portions 70a are displayed at eight corners of the map display frame. Further, by pushing any one of the selection buttons 18 through 28 disposed on the touch tracer 14 to select a desired mode, the current display frame (the map display frame in FIG. 10) is switched to the display frame of the mode thus selected, and the display frame of the mode is displayed on the display 12. For example, when the menu button 22 is pushed, a menu display frame 72 as shown in FIG. 4 is displayed on the display 12. An image representing the finger guide grooves 30 provided on the input pad 16 is displayed at the position corresponding to the operation position of the input pad 16 on the menu display frame 72 displayed on the display 12.

Subsequently, the input pad 16 of the touch tracer 14 is operated with a finger to intercept light passing between the LEDs 44 and the phototransistors 46 which are arranged in the X line and the Y line so as to confront each other. The center position coordinate in a finger-touched area in which the light is intercepted by the finger is calculated by the CPU 60 and it is associated with the display position on the screen, whereby the corresponding menu item is inverted in color on the screen of the display 12. Subsequently, by pressing the input pad 16 with the finger, the touch switch 40 is turned on to select and determine a desired menu item, and the display frame of the display 12 is switched to the display frame for the menu item thus determined.

As described above, when the touch operation is carried out on the input pad 16, the position of a desired (selected) item on the screen of the display 12 and the corresponding position on the input pad can be easily recognized because the finger guide grooves 30 provided on the input pad are displayed on the display 12 in conformity with the screen of the display 12, and thus the position of the desired selected item on the screen of the display 12 and the position on the input pad can be easily recognized, so that the blind operation of the touch tracer 14 can be performed. Accordingly, the operation of the input pad 16 of the touch tracer 14 can be assisted.

In the above embodiment, while the shape of the input pad 16 displayed on the screen of the display 12 is set to the finger guide grooves 30 (two grooves in the longitudinal direction and one groove in the lateral direction) each having an arcuate section, the present invention is not limited to this embodiment.

Figure 11A:
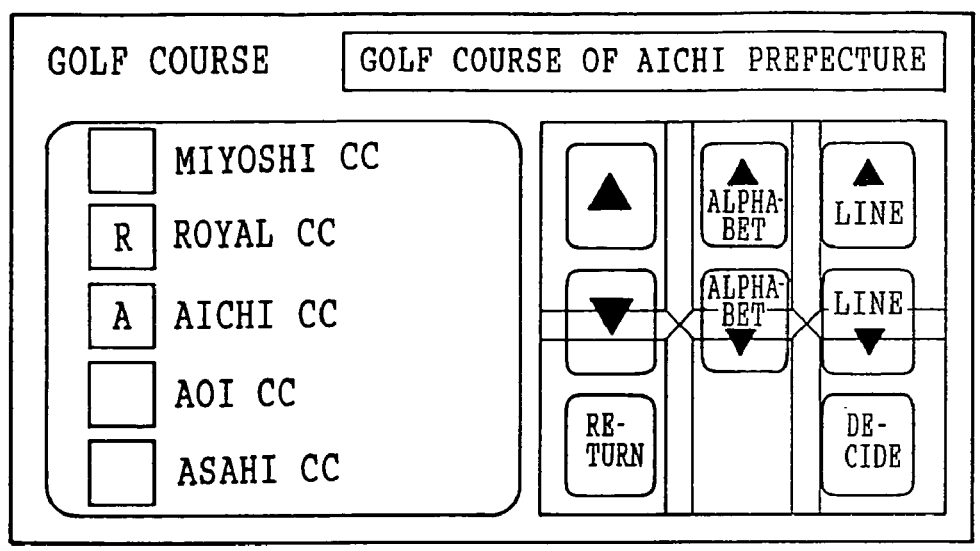
FIGS. 11A and 11B are diagrams showing display frames in which the shape of the input pad is displayed on a part of the display.
Figure 11B:
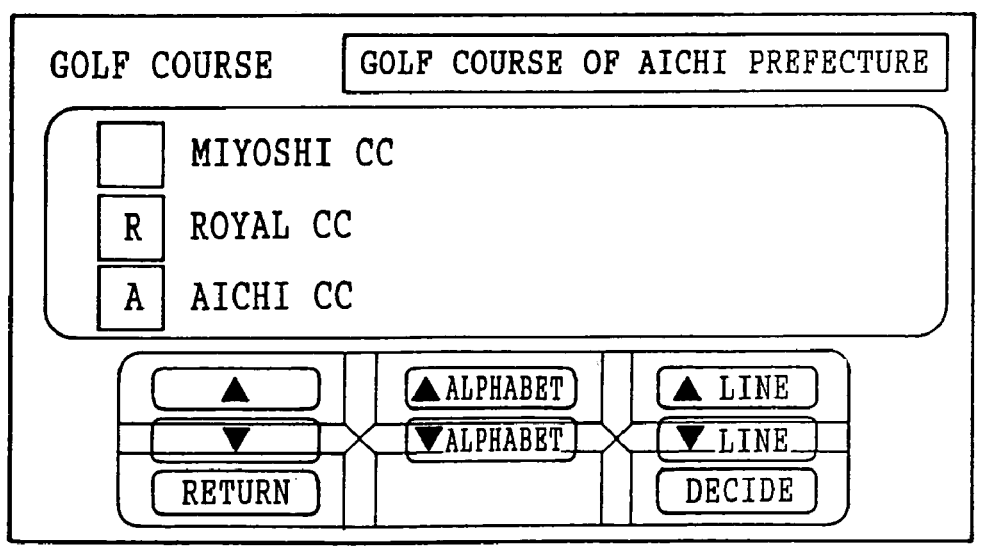

Any shape may be adopted for the input pad 16 to be displayed on the screen of the display 12 insofar as the specific shape of the input pad 16 displayed on the display 12 is coincident with the corresponding one displayed on the screen of the display 12. For example, in the above embodiment, the shape of the input pad to be displayed on the display frame of the display 12 is displayed over the overall screen of the display 12. However, when the switches corresponding to the input pad are displayed at a part of the display frame of the display 12 as shown in FIGS. 11A and 11B, the shape of the input pad 16 may be displayed at the part where the switches corresponding to the input pad 16 are displayed. With this display operation, the overall area of the input pad 16 can be operated, and thus the operation performance can be more enhanced.

Figure 12:
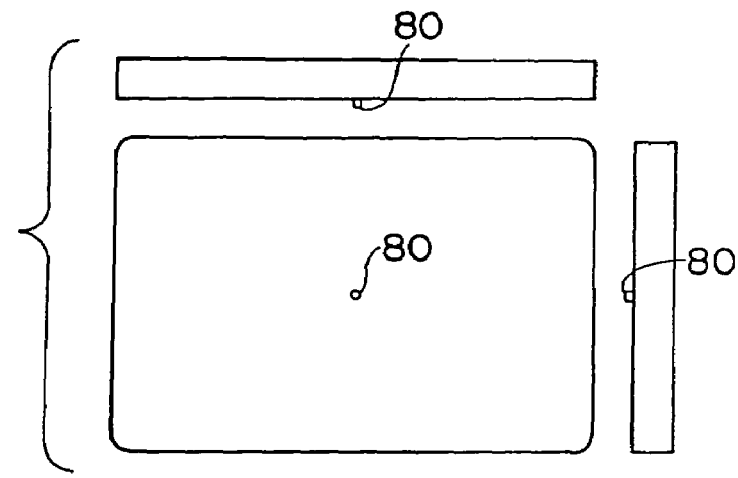
FIG. 12 is a front view showing a second embodiment of the input pad, which contains sectional views showing two faces perpendicular to each other.
Figure 13:
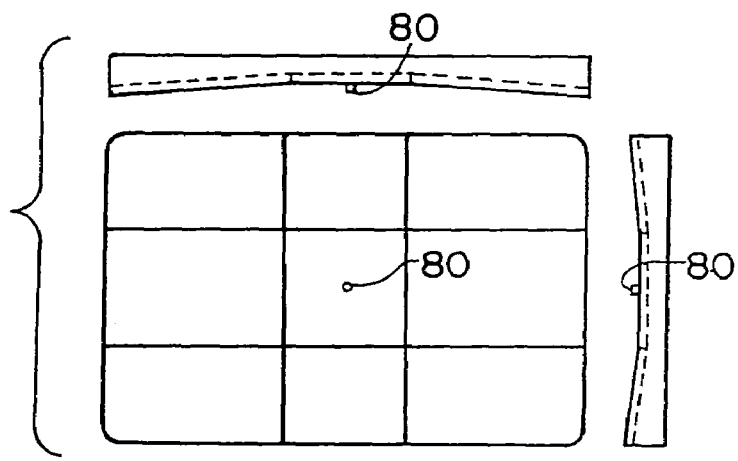
FIG. 13 is a front view showing a third embodiment of the input pad, which contains sectional view showing two faces perpendicular to each other.
Figure 14:
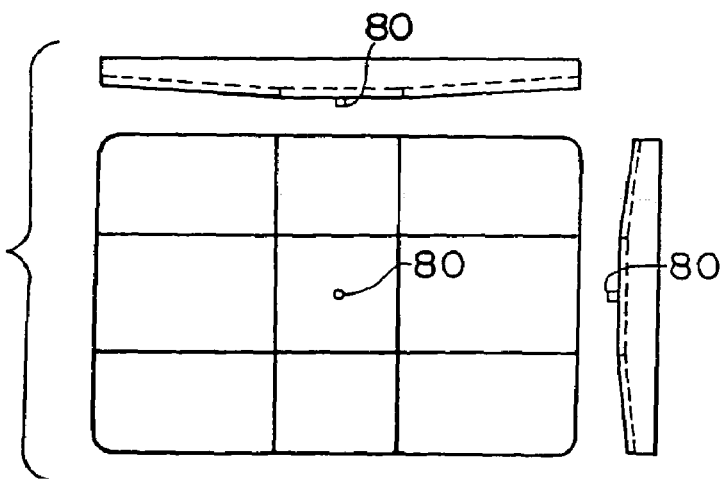
FIG. 14 is a front view showing a fourth embodiment of the input pad, which contains sectional view showing two faces perpendicular to each other.

Any shape may be used for the input pad 16 insofar as the user can easily recognize his/her finger position on the input pad 16 through the shape of the input pad 16, and, for example, shapes as shown in FIGS. 12 through 22 may be adopted. In connection with the shape of the input pad 16, an image representing the shape of the input pad 16 as shown in FIGS. 12 through 22 is displayed on the screen of the display 12. Each of FIGS. 12 through 22 is front and longitudinal and sectional views of each input pad. FIG. 12 shows an input pad in which no operation point is specified. Each of FIGS. 13 and 14 shows an input pad in which three operation points in the longitudinal direction and three points in the lateral direction, totally nine operation points can be identified through blind operation as in the case of FIG. 4. Each of FIGS. 15 through 22 shows an input pad in which three operation points in the longitudinal direction and five operational points in the lateral direction, totally 15 operation points can be identified through blind operation.

In the case of the input pad 16 shown in FIG. 12, a cylindrical boss 80 or semispherical boss is provided at the center portion of the input pad 16 (in FIG. 12, cylindrical boss 80), and the center portion of the input pad 16 can be easily recognized by the finger operation. Therefore, the blind operation can be more enhanced.

In the case of the input pad 16 shown in FIG. 13, the overall surface of the input pad 16 is deformed. That is, the surface of the input pad is designed in a substantially concave shape so that the center portion of the input pad 16 is set as the bottom surface and the peripheral portion around the bottom surface is slanted. In addition, a cylindrical boss 80 is provided at the center portion of the input pad 16 as in the case of FIG. 12. The right-and-left position and the up-and-down position of the input pad 16, that is, respective three places in the longitudinal and lateral directions, totally nine places can be easily identified by the surface deformation of the input pad 16 which is varied among these nine places, so that the blind operation can be more enhanced.

In the case of the input pad 16 shown in FIG. 14, the overall surface of the input pad 16 is deformed in the inverse manner to that of FIG. 13. That is, the surface of the input pad 16 is designed in a substantially convex shape so that the center portion of the input pad is set as the apex, and a cylindrical boss 80 is provided at the center portion of the input pad 16 like the input pad 16 of FIG. 13. The right-and-left position and the up-and-down position of the input pad 16, that is, respective three places in the longitudinal and lateral directions, totally nine places can be easily identified by the surface deformation of the input pad 16 which is varied among these nine places, so that the blind operation can be more enhanced.

In the case of the input pad 16 shown in FIG. 15, two projecting ribs in the longitudinal direction and four projecting ribs in the lateral direction are provided, and a cylindrical boss 80 is provided at the center portion of the input pad 16, whereby the boundaries of 15 places which are partitioned by the ribs can be recognized by finger touch. By operating (sliding) the finger along the ribs in the longitudinal and lateral directions, the displacement of the operation position during the finger touch operation in the longitudinal and lateral directions can be prevented, and thus the blind operation can be more enhanced.

In the case of the input pad 16 shown in FIG. 16, five round recessed portions in the longitudinal direction and three round recessed portions in the lateral direction, totally 15 round recessed portions are provided, and a cylindrical boss 80 for enabling the user to recognize the center portion of the input pad 16 is provided at the center portion of the input pad 16. The respective round recessed portions can be blindly-operated with the cylindrical boss 80 at the center portion to be set as the home position.

In the case of the input pad 16 shown in FIG. 17, five grooves in the longitudinal direction and three grooves in the lateral direction are provided so as to cross one another, and a cylindrical boss 80 is provided at the center portion of the input pad 16. The cross portions of the longitudinal and lateral grooves are chamfered and thus the grooves are widened at these crossing portions, whereby the fifteen operation points of the input pad can be easily recognized. Further, the displacement of the operation position during the finger touch operation can be prevented by sliding the finger along the grooves, so that the blind operability can be more enhanced.

Figure 18:
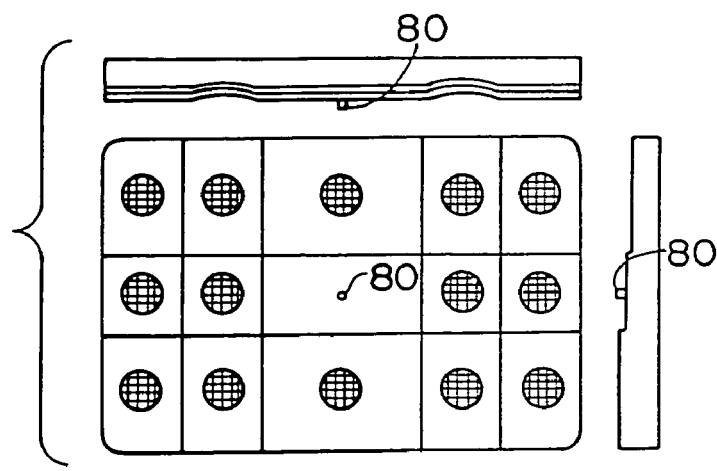
FIG. 18 is a front view showing an eighth embodiment of the input pad, which contains sectional view showing two faces perpendicular to each other.

In the input pad 16 shown in FIG. 18, two finger guide grooves are provided in the longitudinal direction on the input pad 16, and three steps are formed in the longitudinal direction so that each step extends in the lateral direction so as to form the same surface in the lateral direction while the upper portion of the input pad 16 of FIG. 18 is set as the bottom surface. Further, a cylindrical boss 80 is provided at the center portion of the input pad 16. The finger guide grooves in the longitudinal direction enables the finger guide of the finger touch operation in the longitudinal direction, and the finger touch position in the lateral direction can be identified by guiding the finger along each step, so that the blind operability can be more enhanced.

Figure 19:
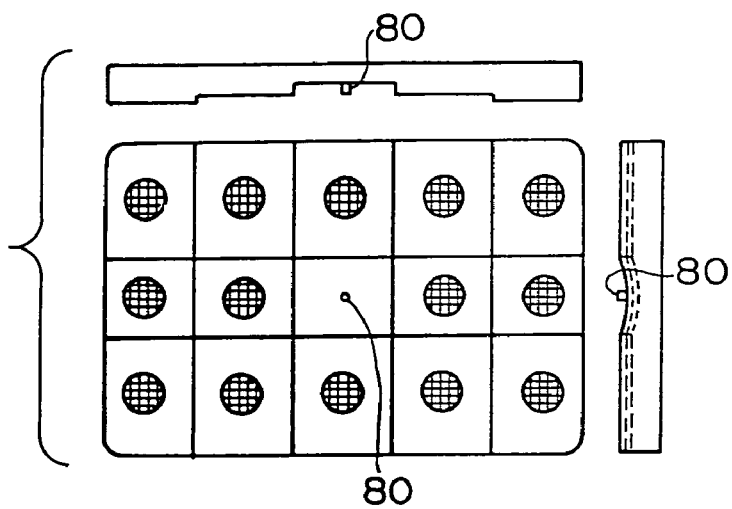
FIG. 19 is a front view showing a ninth embodiment of the input pad, which contains sectional view showing two faces perpendicular to each other.

In the case of the input pad 16 shown in FIG. 19, one finger guide groove is provided in the lateral direction on the input pad 16, and three steps are formed in the lateral direction so that each step extends in the longitudinal direction so as to form the same surface in the longitudinal direction while the center portion of the input pad 16 of FIG. 19 is set as the bottom surface. Further, a cylindrical boss 80 is provided at the center portion of the input pad 16. The finger guide groove in the lateral direction enables the finger guide of the finger touch operation in the lateral direction, and the finger touch position in the longitudinal direction can be identified by guiding the finger along each step, so that the blind operability can be more enhanced.

Figure 20:
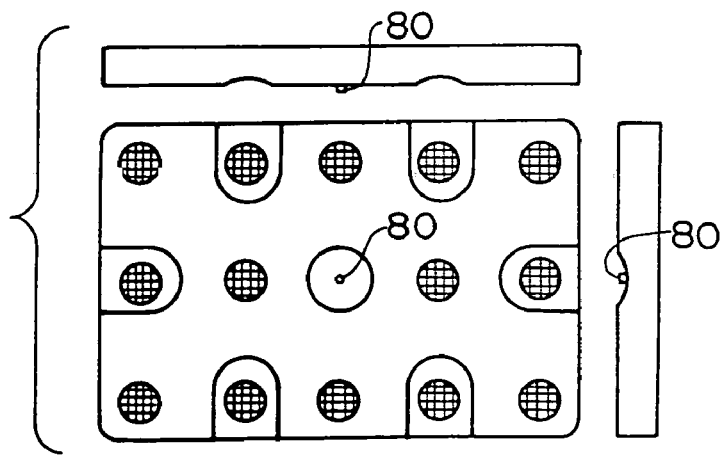
FIG. 20 is a front view showing a tenth embodiment of the input pad, which contains sectional view showing two faces perpendicular to each other.

In the input pad 16 of FIG. 20, a roundly recessed portion is provided at the center portion thereof, and a cylindrical boss 80 is provided at the center portion of the roundly recessed portion. Further, one round groove is provided at each of both edges in the longitudinal direction of the input pad 16, and two round grooves are provided at each of both edges in the lateral direction of the input pad 16. The round grooves and the other portions can be identified on the basis of the cylindrical boss 80, so that the blind operability can be more enhanced.

Figure 21:
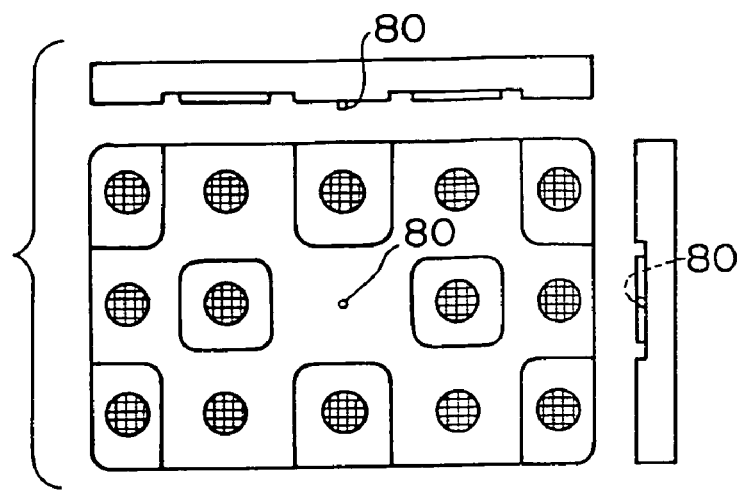
FIG. 21 is a front view showing an eleventh embodiment of the input pad, which contains sectional view showing two faces perpendicular to each other.

In the input pad 16 shown in FIG. 21, rectangular projecting portions are provided at four corners, and totally eight rectangular projecting portions are provided in a staggered arrangement on the basis of the four rectangular projecting portions at the four corners as show in FIG. 21. Further, a cylindrical boss 80 is provided at the center of the input pad 16 so that the center portion of the input pad can be easily identified. The staggered arrangement of the projecting portions and the recessed portions enables the user to easily identify the operation position, and enhances the blind operation more.

Figure 22:
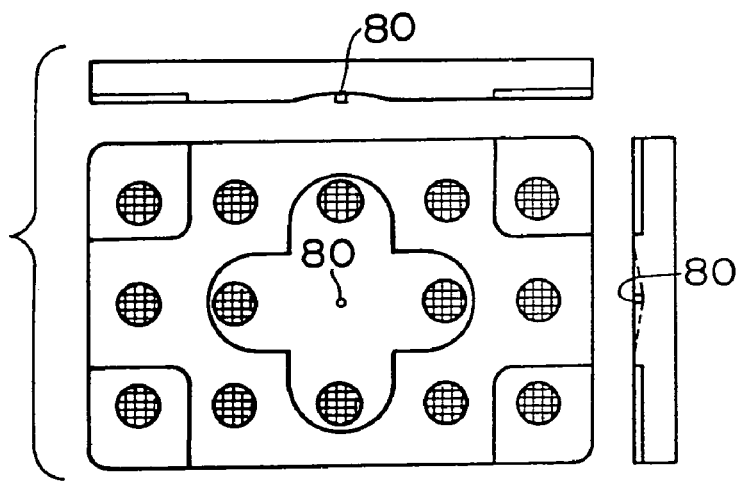
FIG. 22 is a front view showing a twelfth embodiment of the input pad, which contains sectional view showing two faces perpendicular to each other.

In the input pad 16 shown in FIG. 22, recessed portions are provided at four corners on the input pad 16, and a cross-shaped round groove is provided at the center portion of the input pad 16, and a cylindrical boss 80 is provided at the center portion of the cross-shaped round groove. The center portion of the input pad 16 can be identified by the cylindrical boss 80, and the displacement of the operation position in the finger touch operation in the longitudinal and lateral directions can be prevented by sliding the finger along the cross-shaped round groove. The operation position can be identified by the cross-shaped round groove and the recessed portions at the four corners, so that the blind operability can be more enhanced.

By using the input pad shapes shown in FIGS. 12 through 22, the position on the input pad 16 and the position on the screen of the display 12 can be easily identified, and the blind operability can be more enhanced.

Further, in the above embodiments, the shape of the input pad 16 is displayed together with the plural operation items on the screen of the display 12 to easily recognize the operation position of the input pad 16. However, even if the shape of the input pad 16 is not displayed on the screen of the display 12, the shape of the input pad 16 itself enables the blind operation.

As described above, according to the present invention, the positional relationship between the position of the item displayed on the screen of the display and the corresponding position on the touch operation face for the item can be easily identified, thereby enhancing the blind operability for the user when the user operates the touch operation portion while viewing the screen of the display.

What is claimed is:

1. A touch-operating input device comprising:
    a display device for displaying operation function items;
    a touch panel which is provided separately from the display device, said touch panel comprising a touch-operation face for selecting the function items by touch operation, wherein a touch-operation guide shape is formed with convex or concave ribs on said touch-operation face; and
    control means for controlling said display device to display an image representing the touch-operation guide shape formed with the ribs of the touch-operation face of the touch panel, said image having substantially the same geometrical shape as the touch-operation guide shape formed with the ribs, wherein the operation function items are superposed on said image.

2. The touch-operating input device according to claim 1, wherein the touch-operation guide shape is at least one of a convex shape and a concave shape.

3. The touch-operating input device according to claim 2, wherein a plurality of at least one of the convex shape and the concave shape are arranged in a predetermined direction on the touch-operation face.

4. The touch-operating input device according to claim 3, wherein plural pairs of the at least one of the convex shape and the concave shape arranged in the predetermined direction are arranged in a direction intersecting the predetermined direction.

5. The touch-operating input device according to claim 2, wherein at least one of the convex shape and the concave shape is disposed at at least one position serving as a reference for determining a position on the touch-operation face.

6. The touch-operating input device according to claim 2, wherein the convex shape is protruding shape and the concave shape is a recessed shape.

7. A display system comprising a display device for displaying the operation function items and the touch-operation input device as claimed in claim 1.

8. The display system as claimed in claim 7, wherein said display device displays an image representing the touch-operation face, the image being overlapped with the operation function items.

9. The display system according to claim 8, wherein a relative position in the image and a relative position on the touch-operation face correspond with each other.

10. A touch-operating input device comprising a display device for displaying operation function items and a touch panel which is provided separately from the display device and which is for selecting the function items by touch operation, wherein a touch-operation guide shape is formed on the touch-operation face of said touch panel, said touch-operating guide shape is at least one of a convex shape and a concave shape, wherein at least one of the convex shape and the concave shape is disposed at a center portion serving as a reference for determining a center position on the touch-operation face.

11. A touch-operation assisting method for a touch-operating input device comprising (i) a display device for displaying operation function items and (ii) a touch panel which is provided separately from said display device and which comprises a touch-operation face for selecting the function items by touch operation, wherein a touch-operation guide shape is provided with convex or concave ribs on said touch-operation face, said method comprising:

controlling said display device to display an image representing the touch-operation guide shape formed with the ribs of the touch-operation face of the touch panel, said image having substantially the same geometrical shape as the touch-operation guide shape formed with the ribs; and superposing the operation function items on said image.

* * * * *